(12) United States Patent
Hodges et al.

(10) Patent No.: US 8,907,970 B2
(45) Date of Patent: Dec. 9, 2014

(54) APPARATUS AND METHOD OF VIEWING ELECTRONIC DOCUMENTS

(75) Inventors: Peter John Hodges, London (GB); Jonathan Richard Milner-Moore, London (GB); Adriana Maria Eyzaguirre, London (GB)

(73) Assignee: Sony Computer Entertainment Europe Limited, London (GB)

( * ) Notice: Subject to any disclaimer, the term of this patent is extended or adjusted under 35 U.S.C. 154(b) by 953 days.

(21) Appl. No.: 13/056,800

(22) PCT Filed: Jul. 30, 2009

(86) PCT No.: PCT/GB2009/001878
§ 371 (c)(1),
(2), (4) Date: May 4, 2011

(87) PCT Pub. No.: WO2010/015807
PCT Pub. Date: Feb. 11, 2010

(65) Prior Publication Data
US 2011/0221748 A1  Sep. 15, 2011

(30) Foreign Application Priority Data

Aug. 4, 2008 (GB) .................................. 0814220.0

(51) Int. Cl.
*G09F 5/00* (2006.01)
*G06T 15/04* (2011.01)

(52) U.S. Cl.
CPC ...................................... *G06T 15/04* (2013.01)
USPC ........... 345/587; 345/581; 345/582; 345/619; 345/660; 345/667

(58) Field of Classification Search
None
See application file for complete search history.

(56) References Cited

U.S. PATENT DOCUMENTS

| | | |
|---|---|---|
| 2003/0227462 A1 | 12/2003 | Akenine-Moller et al. |
| 2007/0247473 A1 | 10/2007 | Li |
| 2008/0077857 A1 | 3/2008 | Olson |

FOREIGN PATENT DOCUMENTS

| | | |
|---|---|---|
| EP | 1548649 A2 | 6/2005 |
| EP | 1672529 A2 | 6/2006 |

(Continued)

OTHER PUBLICATIONS

International Search Report and Written Opinion, PCT/GB2009/001878, dated Nov. 2, 2009.

(Continued)

*Primary Examiner* — Antonio A Caschera
(74) *Attorney, Agent, or Firm* — Lerner, David, Littenberg, Krumholz & Mentlik, LLP

(57) ABSTRACT

A method of generating an e-book document comprises representing some or all of a page of an electronic document as a graphic textures sequence derived from the document page. The sequence comprises successively smaller graphic textures, arranging them to form a first mip-map suitable for use by 3D graphics hardware, and outputting an e-book document comprising the first mip-map representing some or all of the document page. A method of reading an e-book document includes accessing at least a portion of the mip-map comprising the sequence of graphic textures, constructing a surface in a 3D virtual space comprising one or more polygons, applying to the polygon surface a graphic texture derived from the accessed part of the mip-map responsive to scaling of the polygon surface with respect to an e-book reader display, and displaying the textured polygon surface on the display, thereby displaying some or all of the page.

13 Claims, 8 Drawing Sheets

(56) References Cited

FOREIGN PATENT DOCUMENTS

| | | | | |
|---|---|---|---|---|
| JP | 2000-137563 A | 5/2000 | | |
| JP | 2002215285 A | 7/2002 | | |
| JP | 2004242728 A | 9/2004 | | |
| JP | 2005-182820 A | 7/2005 | | |
| JP | 2005-275797 A | 10/2005 | | |
| JP | 2006-134330 | * | 5/2006 | G06F 3/048 |
| JP | 2006-134330 A | 5/2006 | | |
| JP | 2006172460 A | 6/2006 | | |
| JP | 2008077604 A | 4/2008 | | |
| JP | 2008099755 A | 5/2008 | | |
| JP | 2008517540 A | 5/2008 | | |
| JP | 2008152700 A | 7/2008 | | |

OTHER PUBLICATIONS

Search Report from GB Applicaton No. 0814220.0, dated Nov. 18, 2008.

http:/en.wikipedia.org/wiki/Comparison_of_e-book_formats last modified Jan. 28, 2011.

Card S.K., Hong L., Mackinlay J.D., Chi E.H.: "3Book: A Scalable 3D Virtual Book" ACM, 2 Penn Plaza, Suite 701—New York USA, Apr. 24, 2004, pp. 1095-1098, XP040178928.

Card S.K., Hong L, Mackinlay J.D., Chi E.H.: "3Book: A 3D Electronic Smart Book" ACM, 2 Penn Plaza, Suite 701—New York USA, May 25, 2004, pp. 303-307, XP040180599.

Hong L, Chi E.H., Card S.K.: "Annotating 3D Electronic Books" ACM, 2 Penn Plaza, Suite 701—New York USA, Apr. 2, 2005, pp. 1463-1466, XP040017450.

Lichan Hong et al: "Turning Pages of 3D Electronic Books" 3D User Interfaces, 2006. IEEE Symposium on Alexandria, VA, USA Mar. 25-26, 2006, Piscataway, NJ, USA,IEEE, Mar. 25, 2006, pp. 159-165, XP010923863.

International Preliminary Report on Patentability, PCT/GB2009/001878, dated Nov. 23, 2010.

Japanese Office Action for Application No. 2011-521627 dated Aug. 21, 2013.

* cited by examiner

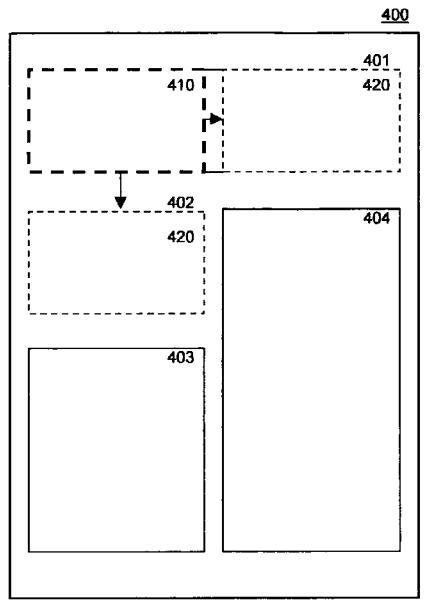
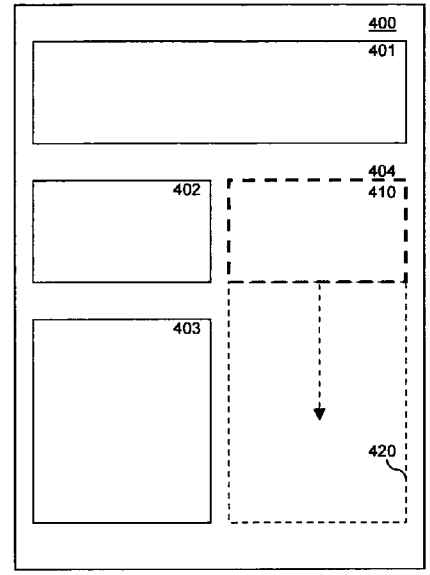
Figure 5A　　　　　　　　Figure 5B
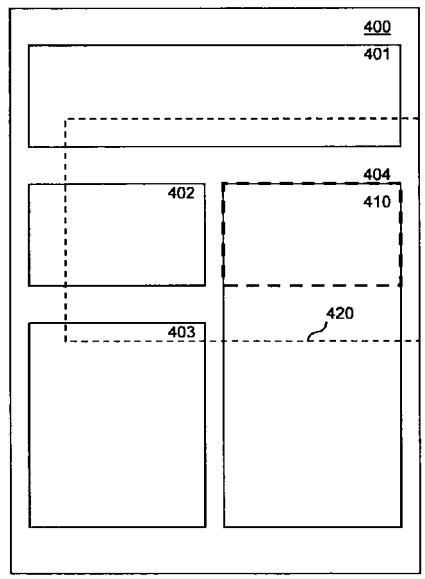
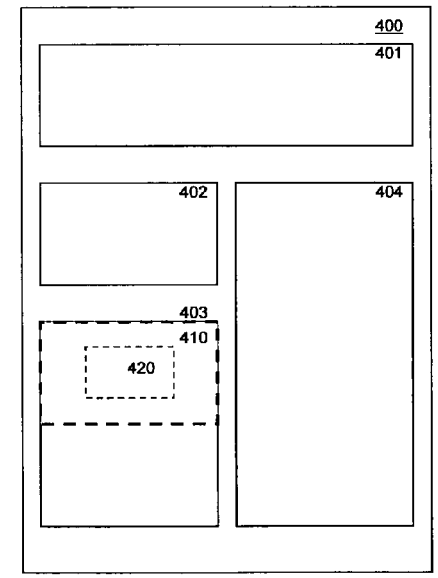
Figure 5C　　　　　　　　Figure 5D

APPARATUS AND METHOD OF VIEWING ELECTRONIC DOCUMENTS

CROSS REFERENCE TO RELATED APPLICATIONS

The present application is a national phase entry under 35 U.S.C. §371 of International Application No. PCT/GB2009/001878 filed Jul. 30, 2009, published in English, which claims the benefit of and priority to GB Patent Application No. 0814220.0 filed Aug. 4, 2008, the entire disclosures of which are hereby incorporated by reference herein.

The present invention relates to an apparatus and method of viewing electronic documents.

So-called 'e-books' are conventional devices for viewing electronic documents, and may take the form of either dedicated hardware (such as the Sony PRS-500) or software applications that adapt conventional hardware to fulfil the equivalent role. It will be understood that hereafter a reference to an 'e-book' or 'e-book reader' encompasses both hardware and software versions.

Historically there has been little agreement between the manufacturers of e-book solutions as to a format for disseminating electronic documents. As a result many formats have been proposed, many of which are based on html/xml (hypertext/extended mark-up languages). Meanwhile the most popular format, the Adobe portable document format (PDF), is based on the printer language Postscript. A comprehensive list of past and present e-book document formats can be found at http://en.wikipedia.org/wiki/Comparison_of_e-book_formats.

Within these formats, in addition to symbolic representations of text, some scanned representations of documents are also available (so-called raster formats). The most popular raster formats for scanned documents are DjVu (commonly referred to as Déjà Vu) and again Adobe PDF. Both use similar methods, employing wavelet-based compression methods for colour or greyscale pictures (e.g. JPEG 2000) whilst for black and white text a graphic character dictionary is generated, either using a selected instance of a character to replace all repeat instances in lossy compression, or using a differential coding based on such a selected instance for each repeat instance in lossless compression.

However, when such raster formats are viewed on handheld e-books or on portable devices running e-book applications, such as mobile phones, personal digital assistants (PDAs) or portable gaming platforms such as the Sony Playstation Portable ®, schemes such as DjVu and PDF suffer from visible scaling artefacts as they are viewed on a small and comparatively low resolution screen. Conversely, to provide a clear high-resolution image at full scale still requires a comparatively large amount of memory to store and/or bandwidth to download to a portable device. In the latter case of downloads, this can also prove expensive to the user and/or service provider.

An attempt to address the memory and bandwidth issues in web-based document readers can be seen in the embedded Google® maps application (see http://maps.google.co.uk/). In Google maps, only a visible section of a map at a first scale is downloaded and viewed, thereby conserving bandwidth. If the user navigates beyond the range of the current section of the map, a new section is downloaded. If the user requires more detail, the embedded application scales up the relevant part of current raster image to the next scale (resulting in a blocky representation of the relevant part of the map), and then downloads a section of a new map (itself a new document, containing additional features) corresponding to the scaled section of the old map. This process can be seen, for example, by placing a mouse cursor over a portion of such a map and using the mouse scroll wheel. The effect is one of continuity whilst providing access to sections of successive documents containing ever more detail.

However, Google maps does not address issues of visual quality in the rendition of a single e-book document.

Thus it is desirable to formulate an e-book format that mitigates or alleviates the above problems of visual quality in conjunction with memory/bandwidth usage, particularly on small or portable e-book readers, and to provide an e-book reader that takes advantage of this format.

In a first aspect there is provided a method according to claim 1.

In another aspect there is provided a method according to claim 6.

In another aspect there is provided a computer program according to claim 11.

In another aspect there is provided an e-book reader according to claim 13.

Further respective aspects and features of the invention are defined in the appended claims.

Embodiments of the present invention will now be described by way of example with reference to the accompanying drawings, in which:

FIGS. 5A-5D are schematic diagrams of data access selections with respect to a page of an electronic document;

An apparatus and method of viewing electronic documents are disclosed. In the following description, a number of specific details are presented in order to provide a thorough understanding of the embodiments of the present invention. It will be apparent, however, to a person skilled in the art that these specific details need not be employed to practise the present invention. Conversely, specific details known to the person skilled in the art are omitted for the purposes of clarity where appropriate.

In an example summary embodiment of the present invention, a page of a digital document is formatted as a so-called mip-map or sequence of graphic textures, comprising images of the document as graphic textures at two or more scales. In an e-book reader, a texture of the mip-map at a first scale is applied to a plane of one or more polygons by a 3D graphics processor of the reader device. The x, y and z co-ordinates of the plane within a 3D space can then be manipulated, either by the user or the reader itself, to pan within the document at a first scale or to zoom within the document by effectively moving it closer to or further from the point of view provided by the screen of the device. In this latter case, the e-book reader or application takes advantage of the ability of 3D graphics processors to smoothly interpolate between mip-map textures at different scales (e.g. by trilinear filtering) in order to provide a high quality display of the document at any scale between the first and last available textures in the mip-map. In the case that the working memory and/or bandwidth of the e-book reader or application is heavily constrained, the mip-map textures can be only partially loaded or downloaded to a cache, for example in response to a pre-set, heuristic or empirically determined reading pattern.

In embodiments of the present invention, a suitable host device for an e-book reader application is the Sony Playstation Portable®.

Figure 1:
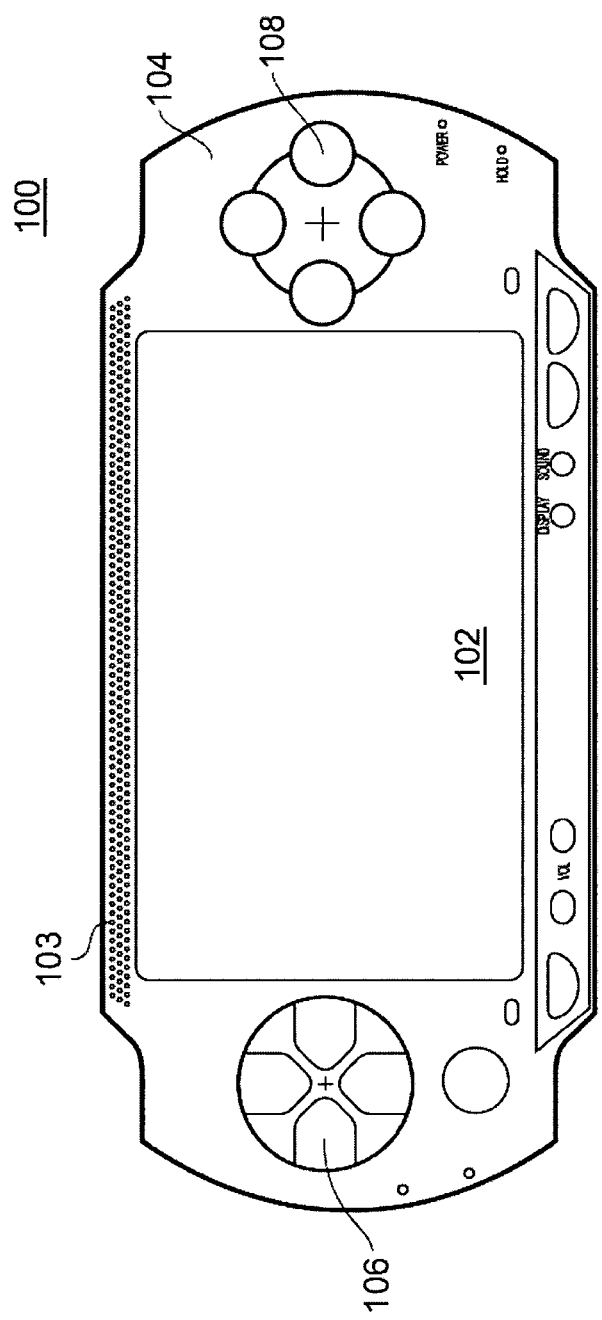
FIG. 1 is an illustration of a Sony® Playstation Portable® entertainment device.

Referring to FIG. 1, in an embodiment of the present invention a Sony® PlayStation Portable® (PSP) entertainment device is a host device 100 for an e-book reader application. The PSP body 104 comprises, inter alia, a left joypad 106 and a right joypad 108. These are used to interface with software running on the PSP. In addition, the PSP comprises an integral display 102 and a speaker 103.

Figure 2:
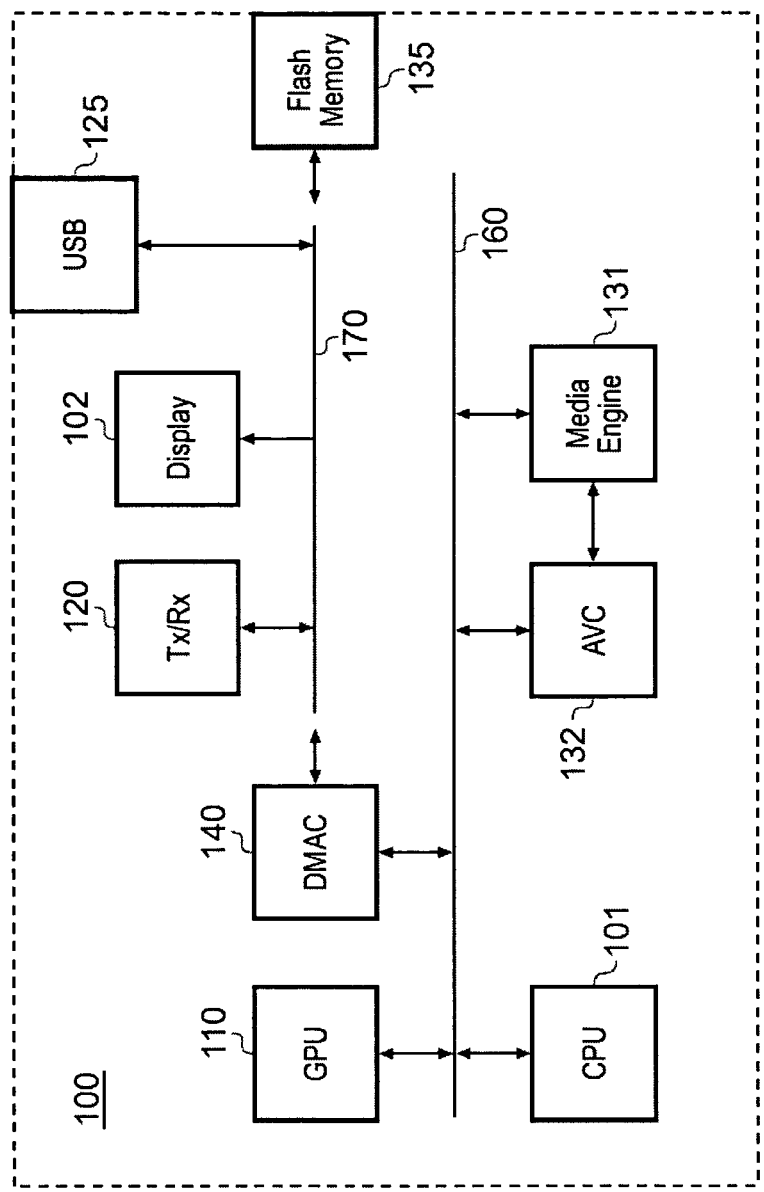
FIG. 2 is a schematic diagram of components of a Sony® Playstation Portable® entertainment device.

Referring now also to FIG. 2, a summary schematic diagram of a PSP is provided. The PSP comprises a central processing unit (CPU) 101, a graphics processing unit (GPU) 110 for polygon rendering, texture scaling and the like, a media engine 131 and an audio/video processor (AVC) 132 for image rendering, video and audio playback and the like, and a direct memory access controller (DMAC) 140, linked by a common bus 160. The DMAC 140 also links to an external bus 170 through which inputs and outputs are communicated, including with a wireless communication means (Tx/Rx) 120, a USB connector 125, a flash memory stick interface 135 that can act as a storage means for the device, an optical drive (not shown) and to the integral display 102.

Figure 3:
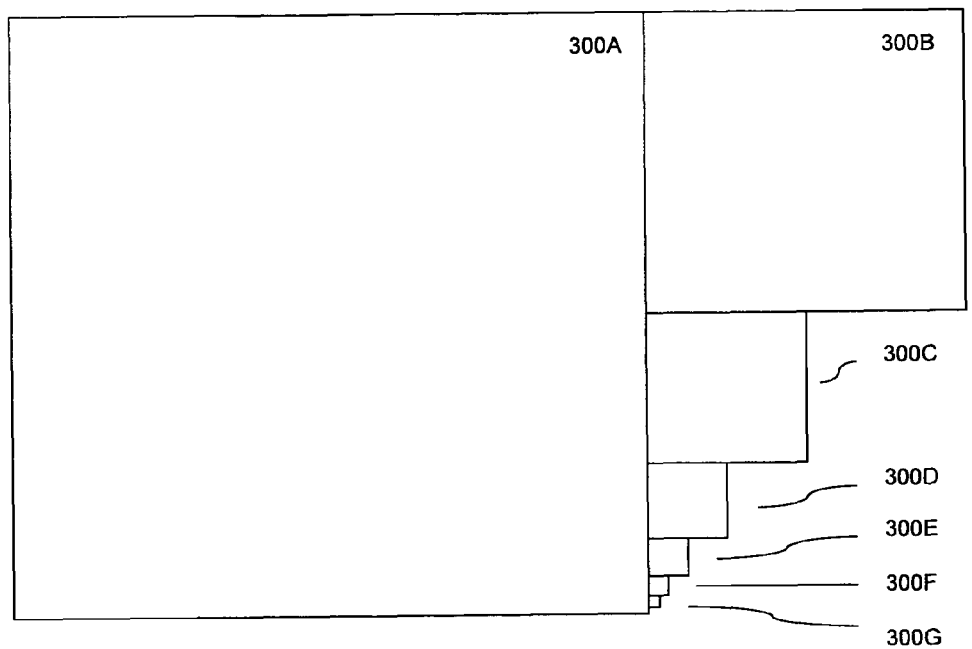
FIG. 3 is a schematic diagram of a mip-map.

Referring now to FIG. 3, in an embodiment of the present invention, a page of a digital document is formatted as a plurality of graphic textures (300A-G) in the form of a mip-map.

The original purpose of mip-maps was to address the problem in video games, simulators, or virtual reality systems that as a potentially large texture (for example 2048×2048 pixels) moves away from the screen's point of view, to display ever smaller versions of it requires the averaging or sampling of ever larger portions of the texture for each screen pixel actually displayed, with the eventual situation being that the entire texture is so far from the screen in the z (depth) direction that it is averaged down to a single pixel. If there are many such pixels in the displayed image then the computational burden in rendering the image becomes immense. One solution is to enforce a so-called 'draw distance', beyond which such textures are not rendered; this limits the number of textures that are required to render a virtual environment and hence limits the computational burden. However, it also causes the undesirable effect that objects apparently vanish from or pop into existence in the virtual environment at the notional draw distance. Mip-maps were posited as a solution by providing pre-scaled, smaller versions (300B-G) of an original resolution principal texture 300A, potentially down to a 1×1 pixel version 300G. In this way textures could appear to scale from full size to a single pixel by averaging within ever smaller versions of the texture, thereby avoiding the computational overhead of always operating on the full resolution texture.

In one scheme—bilinear filtering—the averaging for the purposes of re-scaling the texture is done on one source texture of the mip-map until it is reduced to the scale of the next texture, but this can result in visible 'handover' artefacts as the graphics system swaps from an averaged higher resolution texture to a native lower resolution texture, and also in averaging artefacts with changes in scale as new pixels are incorporated into averages previously based on comparatively few pixels of the source texture (e.g. so-called 'pixel fighting'). Thus in another scheme—trilinear filtering—the texture is interpolated from averages derived from the two mip-map textures bounding the current texture scale, resulting in much smoother handovers and a reduction in averaging artefacts. A further scheme, anisotropic filtering, incorporates perspective within tri-linear filtering; however, for a texture in a plane parallel to the viewing screen, anisotropic filtering therefore essentially reduces back to tri-linear filtering.

Other advantages of mip-mapping include that the textures can be anti-aliased in advance, thereby further reducing computational load in generating smooth images at different scales.

In embodiments of the present invention, a page of a electronic document (a 'page' being understood to be a single planar section of a document; typically equating to one paper page but potentially two or more paper pages as in a centre-fold or gatefold configuration, or a portion of a paper page) is scanned or rendered at the highest desired resolution, hereafter referred to as a 'digital page'. It will be appreciated that the source electronic document may be a scan of a paper document, or a computer originated raster or vector document (such as an adobe .pdf or a Microsoft Word® document).

The digital page is converted to a principal texture or, where the resolution exceeds the maximum permitted size of texture on a particular host device, two or more principal textures. Hence a principal texture can represent some or all of a digital page.

Then, for the or each principal texture, a series of one or more derivative textures is generated at half size (a 50% reduction in each dimension). Thus for a 2048×2048 pixel principal texture, the derivative textures could be 1024, 512, 256, 128, 64, 32, 16, 8, 4, 2 and 1 pixel square.

However, in the present embodiment there is no need to continue the series down to a 1×1 pixel texture; the process can be stopped at the point where the document represented in the texture remains readable, or satisfies some other a visual quality criterion (e.g. the point at which the whole digital page fits within the screen of the e-book in one or both dimensions). As a consequence, notably the resolution of the principal texture need not be a power of two, though clearly it is preferable for the texture size to be exactly divisible by two for at least the duration of the intended texture sequence in the mip-map. Likewise potentially it need not be square, but can reflect the dimensions of the source material.

Thus, for example, a principal texture could have a resolution of 1680×2376, which is exactly divisible by two down to a final texture with a resolution of 210×297, which replicates the relative dimensions of size A4 paper. It will be appreciated that such resolutions are non-limiting examples only, and resolutions may be selected based upon a variety of criteria including the dimensions of the source material, visual quality requirements, the memory capacity of graphics hardware and any constraints imposed by graphics application interfaces.

The selected texture sequence is packaged as a conventional mip-map suitable for processing by the 3D graphics hardware (e.g. GPU 110) of the reader or host device, or for presentation to such hardware by an interface such as Microsoft® Direct X® or OpenGL.

Clearly, in the event that the hardware or the interface expects a mip-map to comprise a full texture sequence down to 1×1 pixel then square textures with dimensions based upon a power of two can be used and either the remaining texture sequence can be provided, or dummy blank textures (amenable to high compression ratios) can be used.

In any event, the digital page may then be rendered by the e-book by constructing a planar surface of one or more polygons conforming to the relative dimensions of the digital page, and applying a texture derived from the or each mipmap to the polygon or polygons as applicable in a conventional manner, to display the digital page.

Then, rather than scaling a raster-format image up or down as in conventional e-book readers, in an embodiment of the present invention the scaling of the document is achieved by moving the polygon surface in the z-axis closer to or further from the notional viewpoint of the user as represented by the screen, and allowing the dedicated 3D graphics hardware (e.g. GPU 110) of the device to generate a texture at the appropriate scale for the perceived distance of the polygon surface, based upon the textures of the mipmap and the z-axis value, and preferably using trilinear filtering.

This has the advantages of utilising dedicated graphics hardware and memory (texture memory) to implement the scaling (thus potentially much faster and/or more smoothly than would be possible using the CPU 101 alone), reducing the ongoing computational load of the CPU to typically just specifying the current z-axis value, and generating smooth images at fractional scales by virtue of access to two representations of the document on either side of the currently displayed scale, as outlined with respect to trilinear filtering above.

In an alternative embodiment, scaling can be achieved by redefining the actual size of the polygon surface to which the or each texture is applied whilst the surface remains at the same notional distance from the display. In this case the mip-maps are again used to interpolate the texture at the resulting scale. However, whilst this method also gains most of the advantages outlined above, recomputation of the polygon plane will in general require relatively more computational resources from the CPU 101 when generating an updated draw list for the GPU 110 to render, in comparison to updating a single parameter (the z-axis value) as in the preceding embodiment.

In either case, the e-book format will therefore comprise the one or more mip-maps for at least a first digital page, an indication of the smallest usable or displayed texture in a mip-map sequence, and an indicator of the digital page dimensions, either explicitly as relative or absolute measurements, by indication of a format (such as A4), or implicitly from the dimensions of the principal texture (or sum thereof if more than one). Where two or more mip-maps are used to form a digital page, their respective placement on the polygon plane should also be indicated, either explicitly or by virtue of their order in a formatted file.

To address constraints on memory or bandwidth in small and/or portable devices, several options are available.

Firstly, in addition to conventional texture compression, the mip-maps can be differentially encoded. In an embodiment of the present invention, the smallest used texture in the proposed texture sequence (for example 300D) is stored and optionally compressed in a conventional fashion. The next largest texture in the sequence (300C) is then represented by obtaining the difference in values between it and a double-scale version of 300D. These difference values will represent the loss in fidelity caused by the scaling down from 300C to 300D and in general will have a much smaller variance than the values of the texture 300C itself, enabling significantly greater compression. 300B is then similarly differentially encoded from a reconstruction of 300C, and likewise 300A is differentially encoded from a reconstruction of 300B.

These textures (or those parts thereof required for the purpose of display or trilinear filtering) can then be reconstructed, either by the GPU 110 if capable, or by the CPU.

In this way the mip-map is more efficiently compressed for the purposes of storage or download.

Secondly, alternatively or in addition only those textures or parts of textures in a mip-map currently required or determined to be required next need be accessed (e.g. downloaded from a network or loaded from local media such as a hard-drive, memory stick or optical disk), to be cached and optionally decompressed/reconstructed.

In a first instance, only those portions of a texture or textures required to generate the current screen display need be accessed. However, this is likely to cause a lag when the user pans or zooms within the document as neighbouring portions of a texture or portions of further textures are accessed to generate the updated screen display.

Therefore in an embodiment of the present invention, neighbouring portions of a texture or portions of further textures are cached in advance in response to a predetermined reading pattern.

Figure 4:
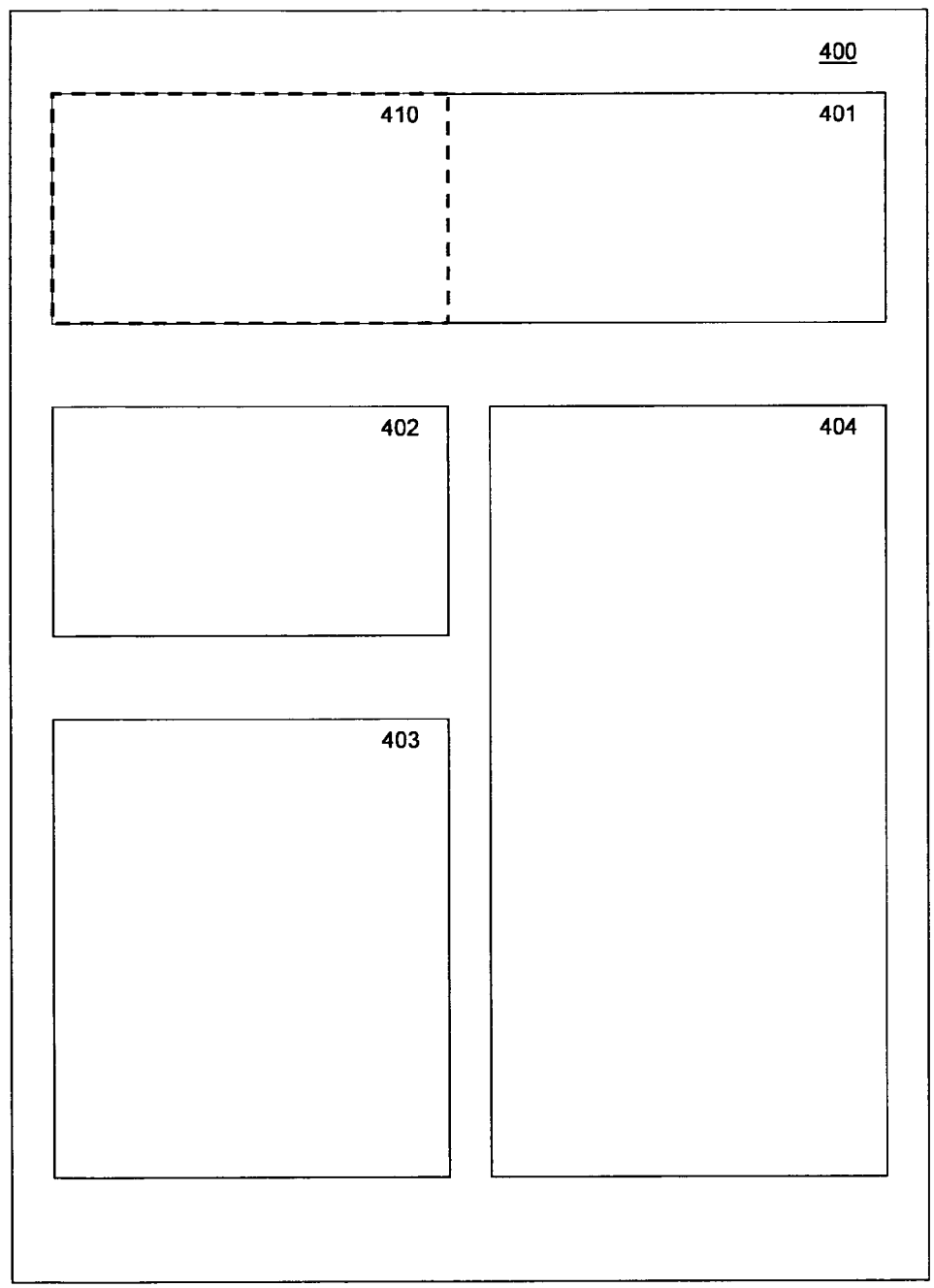
FIG. 4 is a schematic diagram of a page of an electronic document.

Referring now also to FIG. 4, as an example a digital page of a comic book 400 comprises panels 401 to 404. At a particular level of zoom, the region or 'tile' 410 highlighted by dotted lines is visible on the screen of the e-book.

In a first instance, a predetermined reading pattern may take the form of 'next' and 'back' buttons that move the current tile to a new pre-set position on the digital page.

Such a sequence of positions (optionally including sequentially different scaling information) may be arbitrary for each page and embedded as metadata within the e-book format or as a separate data stream. A plurality of such streams or sets of metadata may be made available for different e-book devices responsive to their screen dimensions (and hence tile dimensions) and native resolution, so enabling an enjoyable presentation of the electronic document to be tailored to each device.

Optionally, several sequences may be provided and selected between. For example, a 'fast' sequence may concentrate on views containing dialogue, whilst a 'slow' sequence may provide additional views of background and intervening artwork of the comic. Other sequences may include or exclude pages, panels or text as applicable, for example to exclude scenes of a violent or sexual nature if the user was under a certain age.

Moreover, some sequences may only be available at a premium, and allow access to additional areas of an electronic document.

It will be appreciated that during the composition of such a sequence by the author, publisher or distributor (generally on a PC or other device with a high resolution screen), typically some or all of the page of the document surrounding the view intended to be seen on the respective portable e-book reader would be visible, in order to provide visual context for the choice of composition.

Alternatively, instead of choreographing the user's reading experience in advance, such a sequence of positions and scales may be evaluated at the time of reading, responsive to the relative dimensions of the screen with respect to the relative dimensions of the digital page or sections thereof.

For example, referring now to FIG. 4, a digital page of a comic book 400 comprises panels 401 to 404. At a particular level of zoom, the region or 'tile' 410 highlighted by dotted lines is visible on the screen of the e-book.

Referring now to FIGS. 5A-D, an example predetermined reading pattern stipulates that the reader would move from the left half of panel 401 to the right half, by default to the panel's right edge if it is slightly more than twice as wide as a tile. After that it will jump to panel 402 (FIG. 5A).

Therefore the portions of the texture or textures necessary to render the right half of panel 401 and the whole of panel 402 at the current scale (denoted by the areas 420) are accessed, and cached for potential use.

In FIG. 5B, upon reaching panel 404, this panel is significantly more than two times longer than one of the display dimensions. In this case, rather than jump to the other end of the panel (as in panel 401) and miss out the central third, the predetermined reading pattern can next either jump successively in equal steps through the panel, or pan down it. The relevant textures are cached accordingly.

Thus in a first instance a predetermined reading pattern can be pre-set according to rules responsive to the structure found on the digital page and the current scale of tiling; for plain text this will likely devolve to left-right and top to bottom jumps or panning, whilst for documents with embedded images or borders these can be used to determine scales and framing, either by automated analysis of regions in the digital page or by indicators of where such images or borders are within the digital page (e.g. co-ordinates of diagonally opposite corners). The above rules are exemplary and non-limiting, and other rules will be apparent to the skilled person.

In addition to jumping/panning within a given scale, in FIG. 5C, the user may select to zoom out. Consequently a portion of the texture at the next lowest scale required to zoom from the current scale to form a tile at a scale anywhere down to that next lowest scale may be cached.

Alternatively a user may choose to zoom in. In FIG. 5D a portion of the texture at the next highest scale required to zoom from the current scale to form a tile at a scale anywhere up to that next highest scale may be cached.

At the new tile scale, the rules for predetermined reading can then be reapplied.

In a second instance, a predetermined reading pattern refers solely to the selection and caching of textures and does not constrain the reader in how they view the document. In this case rather than a 'next' button, controls such as joy-pad buttons 106 or 108 may be used to navigate freely over the digital page.

In this case, caching may be based upon heuristics responsive to factors such as:
i. How far to the right of the digital page is the currently viewed tile;
   indicative of the likelihood of panning or jumping further right vs. wishing to jump down and to the left,
ii. How close to the bottom of the digital page is the currently viewed tile;
   similarly indicative of the likelihood of jumping down, once close to the bottom of the page, and/or the likelihood of turning the page,
iii. An estimate of the number of pixels used to represent characters of text;
   determined by pattern matching or metadata regarding the relative size of text in the digital page, and indicative of the likelihood of zooming in or out, depending on the text size.

Other heuristics will be apparent to the skilled person, such as whether the current tile does not closely match at least one dimension of a (possibly partially) displayed image or comic panel (indicative that the reader may zoom in or out to achieve a better match). It will be appreciated that such heuristics can be adapted to the reading style of each language, for example reversing the presumption of reading right to left.

After evaluating such criteria, textures may be cached in order of likelihood of use.

Alternatively or in addition in this second instance caching may be based upon empirical measurements. For example, 50 people may be invited to read the digital page, and their reading strategies are recorded. Caching is then performed in the order of the most probable next action from a given region/scale of the digital page.

Alternatively or in addition, the user's individual reading style could be evaluated and stored in a similar fashion (for example, the reader may be a browser who tends to skip down a page at a relatively low image scale), and this can be incorporated into the heuristics or empirical data disclosed above. Moreover, such user information could be stored and applied to different documents, either universally or differentiated according to document type (e.g. comic, book, newspaper etc).

It will be appreciated that textures need not be accessed on a tile-by-tile basis. Where memory and/or bandwidth permits, the whole mip-map or large portions of it corresponding at least on some scales to multiple tiles may be stored in memory, mitigating the need for caching strategies such as, those disclosed above. Conversely for panning within a digital page at a large scale, subsections of textures significantly smaller than a tile may be supplied over the course of the panning process.

Figure 6A:
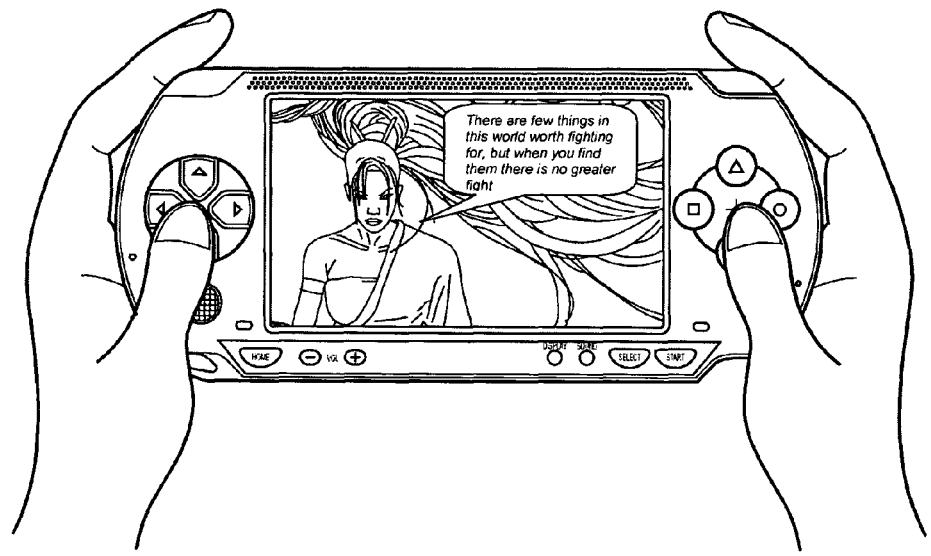
FIGS. 6A and 6B are schematic diagrams of text language regionalisation within an electronic document.
Figure 6B:
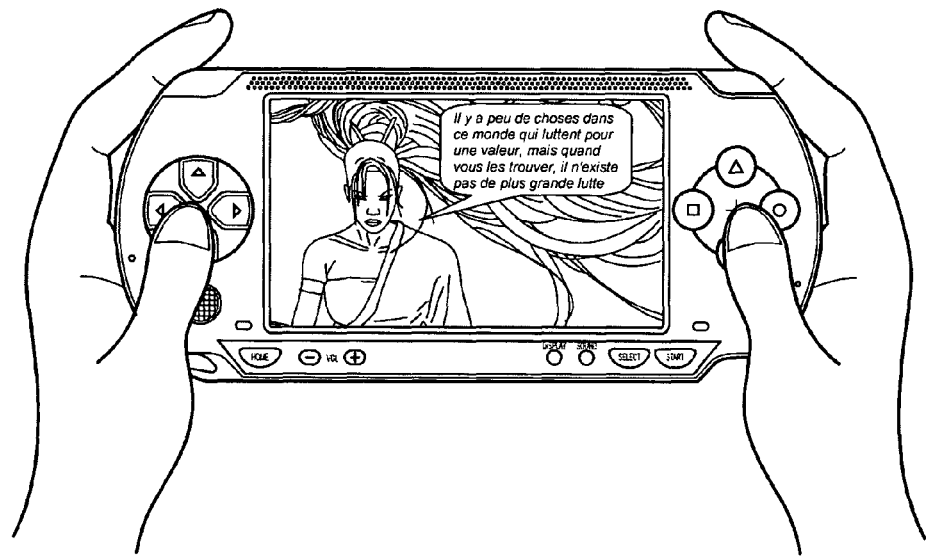

Referring now to FIGS. 6A and B, for some digital documents, particularly those that combine images and text, language regionalisation may be achieved by the use of multiple mip-maps. In this case, the images are represented by one mip-map whilst the text in a respective language is represented by a respective further mip-map. The text may be anti-aliased in advance with respect to the background image, or may be in speech bubbles or boxes that may be similarly anti-aliased. Pixels of the textures not associated with text (or speech bubbles or boxes) will be uniform in value (allowing for efficient compression) and transparent (e.g. with an alpha value of 0). Because such a mip-map is mostly blank and has a comparatively simple colour palette, compression is highly efficient, potentially allowing many more language versions of a digital document to be downloaded or stored in a given space than if the full image with text was stored for each language. Alternatively or in addition, different versions of the text in one language may be made available, for example being modified according to an age rating and selected according to the user's registered age.

To view the image and text together, an embodiment of the present invention takes advantage of the fact that most 3D hardware systems allow the application of multiple textures to a polygon, using alpha values to determine the extent to which superposed texture layers mask lower texture layers.

In this case, the image layer and then the respective text layer are applied to the polygon plane, with the alpha values of the text layer ensuring that the image layer is visible around the text.

To change languages, only the respective mip-map for the respective language then need be changed.

In the event that the 3D hardware system does not allow the application of multiple textures, then the text may effectively be overlaid upon the image by defining a second polygon plane with a z-axis value fractionally smaller than that of the first polygon frame, and applying textures of the respective text mip-map to it. The 3D hardware will contain a so-called depth- or z-buffer that determines which pixels of the two polygon planes are visible. In this case it will be those of the text in preference to the image, except where the texture is transparent. In such a circumstance a z-buffer with a large bit depth (e.g. 24 or 32) would allow the textures to be finely distinguished in the z-direction (thereby allowing for the scale of both textures to be substantially the same, and hence allowing for consistent pixel alignment between textures).

It will be appreciated that such secondary texture layers need not be restricted to text. For example alternative artwork may be provided for certain elements of a page, for example to obscure or sanitise scenes unsuitable for a young reader, or to provide additional information such as artist's notes and/or rough sketches to be overlaid on the main document. In this case multiple texture layers can be used to allow both the background image, the text in the appropriate language and the additional layer or layers to be presented in a desired order. Again if the 3D hardware cannot support layers (or enough layers) then multiple polygon surfaces can be used as disclosed previously.

Likewise, it will be appreciated that the data source for the different mip-maps need not all be the same; for example a comic may be issued on an optical disc, but supplementary content such as additional languages, author's notes and sketches etc., may be downloaded.

Finally, in addition to static textures, in an embodiment of the present invention an e-book document may comprise resources to enable animated content.

In a first instance, this may comprise information regarding the animation of turning pages (if used), including the optional specification of stencil buffer values and stencil modifiers to define shadowing effects during such animations.

In addition to animating the e-book document itself, animations of the content of the document may also be considered.

The e-book document may include further mip-map textures and also specific, custom specifications for polygons, enabling the introduction and animation of additional graphic elements. These may simply be objects that appear to move in front of the page, but potentially can interact more closely as follows:

The e-book document can optionally include a pre-determined array of z-buffer values (typically for the principal texture) that allows a determination of the relative depth position of each pixel in the rendered texture. By transferring this prepared z-buffer information to the 3D graphics hardware (typically with an offset corresponding to the current distance of the page from the viewpoint, as disclosed previously), the flat texture applied to the polygon surface can be treated as having varying depth. For example, a panel of a comic could illustrate an underwater scene with a sunken boat to the left, seaweed spanning the middle of the panel from top to bottom, and a cave to the right. In the prepared z-buffer data the boat has a positive offset (making it more distant), the seaweed has a negative z-buffer offset (making it closer), whilst the rear of the cave mouth is positive and the front is negative.

The e-book document also contains a polygon model for a fish (either in 3D or as another flat surface) and a mip-map (or a texture if this animation only occurs at a specific scale) depicting the fish. The fish is given a zero z-buffer offset in this example and, moving from left to right, may then appear to swim in front of the boat, behind the seaweed and into the cave.

Other layers may have additional pre-determined z-buffer information that can be overlaid upon it. For example, a regionalised text may have a strong negative z-buffer offset so that it always appears on top of such animations, whilst the remainder of the z-buffer is unchanged and conforms to the prepared z-buffer information associated with the image.

Figure 7:
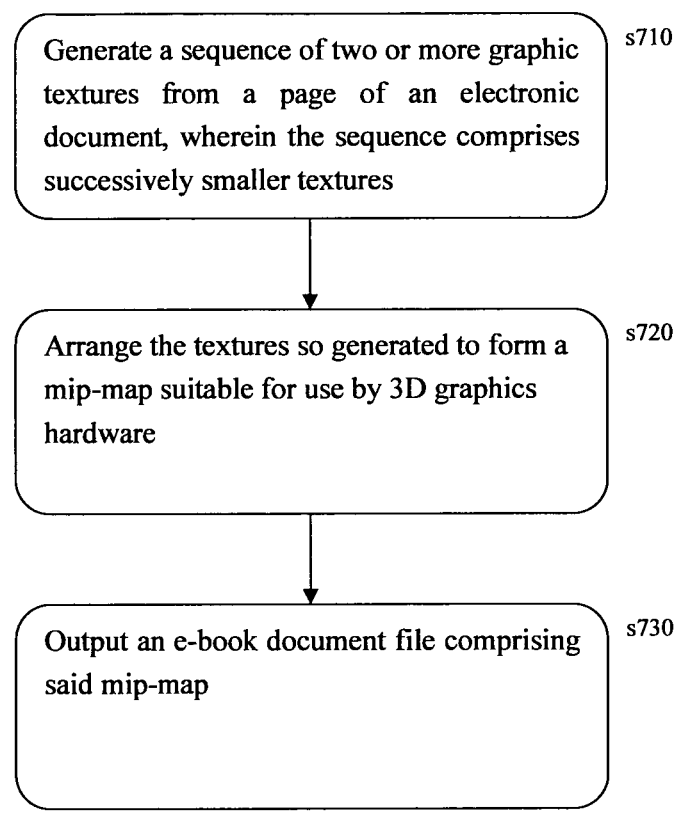
FIG. 7 is a flow diagram of a method of generating an e-book document.

Referring now to FIG. 7, a method of generating an e-book document comprises:

in a first step s710, representing some or all of a page of an electronic document as a sequence of two or more graphic textures from the page of the electronic document, wherein the sequence comprises successively smaller textures;

in a second step s720, arranging the textures so generated to form a mip-map suitable for use by 3D graphics hardware; and in a third step s730, outputting an e-book document file comprising said mip-map representing some or all of said page of said document.

It will be apparent to a person skilled in the art that variations in the above method corresponding to operation of the various embodiments of the apparatus described above are considered within the scope of the present invention, including but not limited to:

Representing a page of a digital document using two or more mip-maps;

Representing a page of a digital document using two layers of mip-maps, for example an image layer and a text layer;

Incorporating within the e-book document file two or more text mip-maps for different respective languages;

Incorporating within the e-book document file additional resources for animations;

Incorporating within the e-book document file one or more pre-prepared z-buffer data sets Generating a partial mip-map sequence limited by readability or aesthetic criteria, and optionally substituting dummy/blank textures for the remainder of the mip-map sequence if required;

Generating non-square mip-maps, for example based upon the dimensions of the digital document;

Incorporating metatdata including one or more selected from the list consisting of:
an indication of the smallest usable or displayed texture in a mip-map sequence,
an indicator of the digital page dimensions,
an indicator of relative texture placements,
an indication of text size relative to page size,
an indication of the placement of features within the digital page (for example corner positions), and
an indication of one or more positions at which to place the viewpoint of the e-book within a page and/or and indication of the scale; and Composing a reading sequence for a particular screen size with reference to the larger document.

Figure 8:
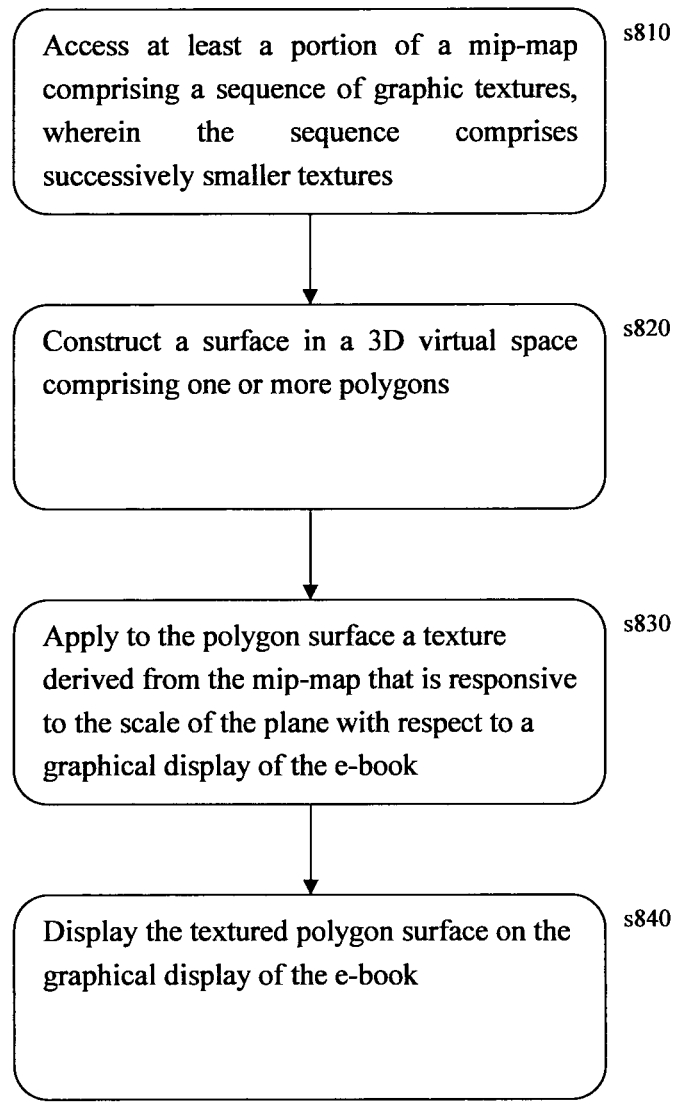
FIG. 8 is a flow diagram of a method of reading an e-book document.

Referring now to FIG. 8, a method of reading an e-book document, in which some or all of a page of the document is represented by a mip-map, comprises:

in a first step s810, accessing at least a portion of a mip-map comprising a sequence of graphic textures, wherein the sequence comprises successively smaller textures;

in a second step s820, constructing a surface in a 3D virtual space comprising one or more polygons;

in a third step s830, applying to the polygon surface a texture derived from the mip-map that is responsive to the scale of the plane with respect to a graphical display of the e-book; and in a fourth step 840, displaying the textured polygon surface on the graphical display of the e-book, thereby displaying some or all of the page of the document.

It will be apparent to a person skilled in the art that variations in the above method corresponding to operation of the various embodiments of the apparatus described above are considered within the scope of the present invention, including but not limited to:

Accessing at least a portion of two or more mip-maps, corresponding to different parts of a digital page and/or to different layers (such as image and text);

Applying at least a portion of two or more mip-maps to the polygon surface, corresponding to different parts of a digital page and/or to different layers (such as image and text);

Zooming in and out of the document by adjusting the depth value of the polygon surface;

Generating the currently displayed texture(s) at the current scale based upon mip-map textures at the next available scales above and below the current scale; for example by using tri-linear filtering;

Restricting the zoom function of the e-book reader to the minimum and maximum allowed by the mip-map textures, including where the smallest allowed texture is not the smallest available or possible texture;

Constructing the polygon surface in response to the dimensions of the primary texture of the or each mip-map or some other metadata indicative of the dimensions of the digital page;

Constructing additional resources to be animated in conjunction with the displayed document;

Generating a set of z-buffer values based upon a prepared set of values associated with the displayed document;

Accessing only those textures required to render the current screen image at the current scale; and Accessing textures required to render different views (portions and/or scales) of a digital page for future viewing, based upon one or more selected from the list consisting of:
  a pre-set viewing/reading sequence,
  heuristics to predict the user's viewing sequence, and
  empirical measurements of probable user viewing sequence.

It will be appreciated that an e-book document generated according to the methods described herein may be stored on a data carrier such as a floppy disk, optical disk, hard disk, PROM, RAM, flash memory or any combination of these or other storage media, or transmitted via data signals on a network such as an Ethernet, a wireless network, the Internet, or any combination of these of other networks.

Finally, it will be appreciated that the methods disclosed herein may be carried out on conventional hardware suitably adapted as applicable by software instruction or by the inclusion or substitution of dedicated hardware.

Thus the required adaptation to existing parts of a conventional equivalent device may be implemented in the form of a computer program product or other object of manufacture comprising processor implementable instructions stored on a data carrier such as a floppy disk, optical disk, hard disk, PROM, RAM, flash memory or any combination of these or other storage media, or transmitted via data signals on a network such as an Ethernet, a wireless network, the Internet, or any combination of these of other networks, or realised in hardware as an ASIC (application specific integrated circuit) or an FPGA (field programmable gate array) or other configurable circuit suitable to use in adapting the conventional equivalent device.

The invention claimed is:

1. A method of generating an e-book document, comprising the steps of:
    representing some or all of a page of an electronic document as a sequence of two or more graphic textures derived from the page of the electronic document, wherein the sequence comprises successively smaller graphic textures;
    arranging the graphic textures so generated to form a first mip-map suitable for use by 3D graphics hardware;
    generating, by a processor, a further mip-map of graphic textures corresponding to a layer of text, the graphic textures of the further mip-map being suitable for superposition over the graphic textures of the first mip-map during display by an e-book reader; and
    outputting, by the processor, an e-book document comprising said mip-maps.

2. A method according to claim 1, in which the smallest of the sequence of graphic textures from the page of the electronic document is determined by a readability or aesthetic criterion.

3. A method according to claim 1, in which the dimensions of the graphic textures in the first mip-map are responsive to the dimensions of the page of the electronic document.

4. A non-transitory computer-readable storage medium storing an e-book document generated according to the method of claim 1.

5. A method of managing an e-book document in which some or all of a page of the document is represented by a first mip-map, the method comprising the steps of:
    accessing at least a portion of the mip-map comprising a sequence of graphic textures, wherein the sequence comprises successively smaller textures;
    accessing at least a portion of a further mip-map comprising a sequence of graphic textures corresponding to a layer of text, wherein the sequence comprises successively smaller textures;
    constructing, by a processor, a surface in a 3D virtual space comprising one or more polygons;
    applying, by the processor to the polygon surface, a graphic texture derived from the accessed part of the first mip-map that is responsive to scaling of the polygon surface with respect to a graphical display of an e-book reader;
    applying to the polygon surface a graphic texture derived from the accessed part of the further mip-map that is responsive to the scaling of the polygon surface with respect to a graphical display of an e-book reader; and
    displaying the textured polygon surface on the graphical display of the e-book reader, thereby displaying some or all of the page of the document.

6. A method according to claim 5, in which the graphic texture applied to the polygon surface is derived from the mip-map using tri-linear filtering.

7. A method according to claim 5, in which the scaling of the polygon surface with respect to the graphical display of the e-book is responsive to an effective distance within the virtual space of the polygon surface from the graphical display of the e-book reader.

8. A method according to claim 5, comprising the steps of:
    accessing a first portion of the first mip-map to enable the construction and display of a first view of an e-book document by an e-book reader; and
    accessing a second portion of the first mip-map to enable the future construction and display of a second view of the e-book document by the e-book reader, in which the selection of the second portion is responsive to one or more selected from the list consisting of:
    i. a pre-set viewing sequence;
    ii. heuristics predicting a user's viewing sequence; and
    iii. empirical probability measurements predicting a user's viewing sequence.

9. A non-transitory computer-readable storage medium on which computer readable instructions of a program are stored, the instructions, when executed by a processor, cause the processor to perform a method of managing an e-book document, the method comprising:

representing some or all of a page of an electronic document as a sequence of two or more graphic textures derived from the page of the electronic document, wherein the sequence comprises successively smaller graphic textures;

arranging the graphic textures so generated to form a first mip-map suitable for use by 3D graphics hardware;

generating, by a processor, a further mip-map of graphic textures corresponding to a layer of text, the graphic textures of the further mip-map being suitable for superposition over the graphic textures of the first mip-map during display by an e-book reader; and outputting an e-book document comprising said mip-maps.

10. A non-transitory computer-readable storage medium on which computer readable instructions of a program are stored, the instructions, when executed by a processor, cause the processor to perform a method of managing an e-book document in which some or all of a page of the document is represented by a mip-map, the method comprising:

accessing at least a portion of the mip-map comprising a sequence of graphic textures, wherein the sequence comprises successively smaller textures;

accessing at least a portion of a further mip-map comprising a sequence of graphic textures corresponding to a layer of text, wherein the sequence comprises successively smaller textures;

constructing a surface in a 3D virtual space comprising one or more polygons;

applying to the polygon surface a graphic texture derived from the accessed part of the first mip-map that is responsive to scaling of the polygon surface with respect to a graphical display of an e-book reader;

applying to the polygon surface a graphic texture derived from the accessed part of the further mip-map that is responsive to the scaling of the polygon surface with respect to a graphical display of an e-book reader; and displaying the textured polygon surface on the graphical display of the e-book reader, thereby displaying some or all of the page of the document.

11. An e-book reader for reading an e-book document in which some or all of a page of the document is represented by a mip-map, the e-book reader comprising:

data access logic arranged in operation to access at least a portion of a first mip-map comprising a sequence of graphic textures, wherein the sequence comprises successively smaller textures, and to access at least a portion of a further mip-map comprising a sequence of graphic textures corresponding to a layer of text, wherein the sequence comprises successively smaller textures;

a graphics processor configured to construct a surface in a 3D virtual space comprising one or more polygons and apply to that surface a graphic texture derived from the accessed part of the first mip-map that is responsive to scaling of the surface with respect to a graphical display of the e-book reader, and to apply to that surface a graphic texture derived from the accessed part of the further mip-map that is responsive to the scaling of the surface with respect to a graphical display of the e-book reader; and a graphical display for displaying the textured polygon surface, thereby displaying some or all of the page of the document.

12. An e-book reader according to claim 11 in which the graphics processor derives the graphic texture applied to the surface from the first mip-map using tri-linear filtering.

13. An e-book reader according to claim 11, in which the scaling of the surface with respect to the graphical display of the e-book is responsive to the effective distance within the 3D virtual space of the polygon surface from the graphical display of the e-book reader.

\* \* \* \* \*